(12) United States Patent
Johnson et al.

(10) Patent No.: US 10,399,483 B2
(45) Date of Patent: Sep. 3, 2019

(54) VEHICLE ILLUMINATION ASSEMBLY

(71) Applicant: Ford Global Technologies, LLC, Dearborn, MI (US)

(72) Inventors: Aaron Bradley Johnson, Allen Park, MI (US); Stuart C. Salter, White Lake, MI (US); Paul Kenneth Dellock, Northville, MI (US); Stephen Kenneth Helwig, Farmington Hills, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 15/453,090

(22) Filed: Mar. 8, 2017

(65) Prior Publication Data

US 2018/0257546 A1 Sep. 13, 2018

(51) Int. Cl.

| | |
|---|---|
| *B60Q 1/48* | (2006.01) |
| *B60Q 1/24* | (2006.01) |
| *F21W 102/40* | (2018.01) |
| *F21W 103/60* | (2018.01) |
| *F21S 43/20* | (2018.01) |
| *F21S 43/10* | (2018.01) |
| *F21S 43/14* | (2018.01) |
| *F21S 43/16* | (2018.01) |
| *F21W 102/17* | (2018.01) |

(52) U.S. Cl.
CPC ............... *B60Q 1/48* (2013.01); *B60Q 1/24* (2013.01); *F21S 43/10* (2018.01); *F21S 43/14* (2018.01); *F21S 43/16* (2018.01); *F21S 43/255* (2018.01); *F21S 43/26* (2018.01); *B60Q 2400/50* (2013.01); *F21W 2102/17* (2018.01); *F21W 2102/40* (2018.01); *F21W 2103/60* (2018.01)

(58) Field of Classification Search
CPC .. B60Q 1/24; B60Q 1/48; B60Q 1/484; F21S 43/14; F21S 43/255; F21S 43/50
See application file for complete search history.

(56) References Cited

U.S. PATENT DOCUMENTS

| | | |
|---|---|---|
| 2,486,859 A | 11/1949 | Meijer et al. |
| 3,234,507 A | 2/1966 | Bohn |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Robert J May
*Assistant Examiner* — Leah Simone Macchiarolo
(74) *Attorney, Agent, or Firm* — Vichit Chea; Price Heneveld LLP

(57) ABSTRACT

An illumination assembly is provided herein. The illumination assembly includes a first light source configured to generate an illumination pattern. A second light source is configured to generate an image within the illumination pattern. A lens is optically coupled with the first and second light sources. A controller is configured to control the activation state of the first and second light sources.

17 Claims, 10 Drawing Sheets

(56) References Cited

U.S. PATENT DOCUMENTS

| | | | |
|---|---|---|---|
| 6,117,362 A | 9/2000 | Yen et al. | |
| 6,294,990 B1 | 9/2001 | Knoll et al. | |
| 6,299,333 B1* | 10/2001 | Pastrick | B60Q 1/2665 |
| | | | 340/475 |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,052,149 B2 | 5/2006 | Suzuki et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthan et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 9,656,602 B2* | 5/2017 | Needham | H04N 9/3173 |
| 2002/0159741 A1 | 10/2002 | Graves et al. | |
| 2002/0163792 A1 | 11/2002 | Formoso | |
| 2003/0147247 A1* | 8/2003 | Koike | B60Q 1/484 |
| | | | 362/464 |
| 2003/0167668 A1 | 9/2003 | Kuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0117364 A1* | 6/2005 | Rennick | B60R 1/1207 |
| | | | 362/540 |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0053195 A1* | 3/2007 | Alberti | B60Q 1/2665 |
| | | | 362/494 |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0161379 A1* | 6/2009 | Liesener | B60Q 1/2665 |
| | | | 362/494 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2010/0283590 A1* | 11/2010 | Tee | A42B 3/044 |
| | | | 340/432 |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0197187 A1* | 7/2015 | Salter | F21S 43/13 |
| | | | 362/510 |
| 2015/0203026 A1 | 7/2015 | Schotanus | |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |

(56) References Cited

U.S. PATENT DOCUMENTS

| | | |
|---|---|---|
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 29804296 U1 | 3/1998 |
| DE | 10319396 A1 | 11/2004 |
| DE | 102009038406 A1 | 3/2011 |
| DE | 102014007195 A1 | 11/2015 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |
| WO | 2016012651 A1 | 1/2016 |

\* cited by examiner

VEHICLE ILLUMINATION ASSEMBLY

FIELD OF THE INVENTION

The present invention generally relates to vehicular lighting, and more particularly to vehicle lighting assemblies disposed on an exterior portion of the vehicle.

BACKGROUND OF THE INVENTION

Vehicular lighting assemblies are generally installed on exterior portions of a vehicle to illuminate the ground surrounding the vehicle to assist an occupant approaching the vehicle. It is therefore desired to implement improved lighting assemblies for further assistance of vehicle occupants.

SUMMARY OF THE INVENTION

According to one aspect of the present disclosure, an illumination assembly is disclosed. The illumination assembly includes a first light source configured to generate an illumination pattern. A second light source is configured to generate an image within the illumination pattern. A lens is optically coupled with the first and second light sources. A controller is configured to control the activation state of the first and second light sources.

According to another aspect of the present disclosure, a vehicle is disclosed. The vehicle includes a first illumination assembly configured to illuminate an area proximate a first lateral side of said vehicle. A second illumination assembly is configured to illuminate an area proximate a second lateral side of said vehicle. A sensor is configured to detect objects proximate the vehicle. The first or second illumination assembly illuminates a lateral side of the vehicle corresponding to a detected object.

According to yet another aspect of the present disclosure, an illumination assembly is disclosed. The illumination assembly includes a first light source configured to generate an illumination pattern. A second light source is operably coupled with an image filter to generate an image within the illumination pattern. A controller is configured to control the activation state of the first and second light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
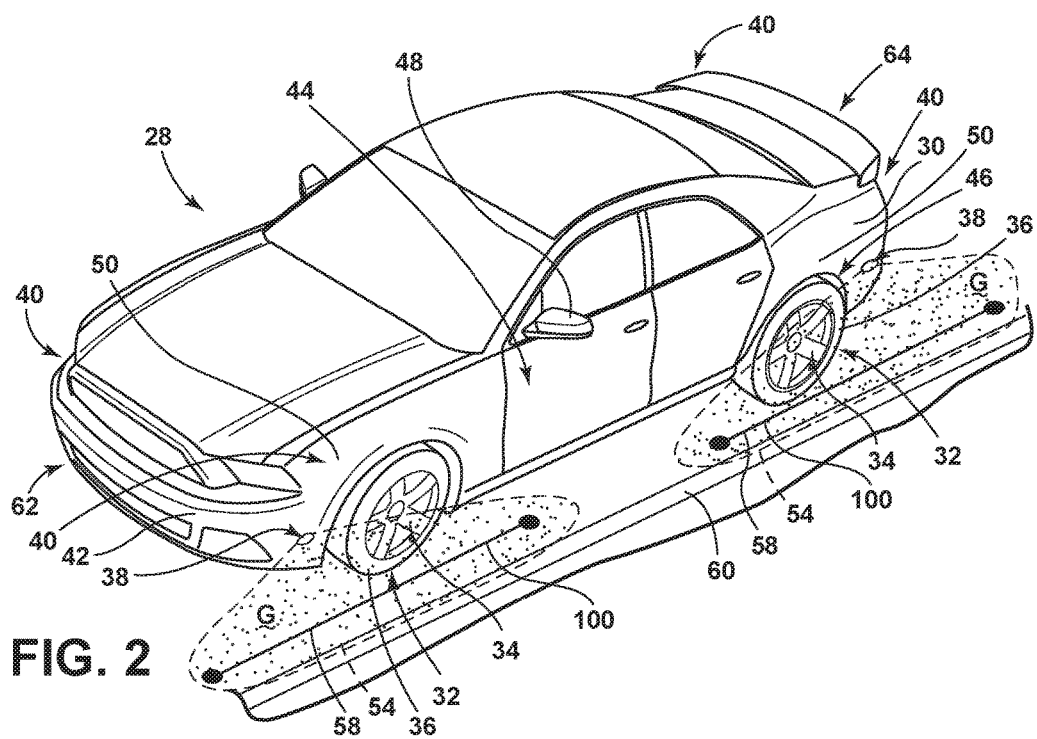
FIG. 2 is a side perspective view of a vehicle having illumination assemblies located near a front portion and a rear portion of the vehicle for illuminating a ground surface proximate the vehicle, according to various embodiments.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a vehicle. In various embodiments, the illumination assembly alters an illumination pattern based on a wide array of vehicle conditions. The illumination assembly may advantageously employ one or more phosphorescent and/or luminescent structures to illuminate in response to predefined events. The one or more luminescent structures may be configured to convert excitation light received from an associated light source and re-emit the light at a different wavelength typically found in the visible spectrum.

Figure 1A:
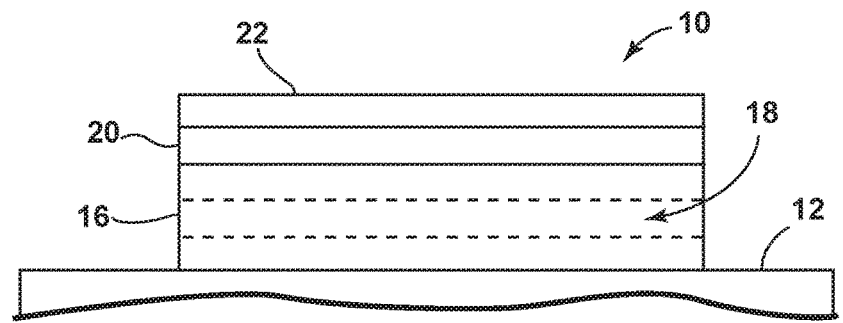
FIG. 1A is a side view of a luminescent structure rendered as a coating, according to various embodiments.
Figure 1B:
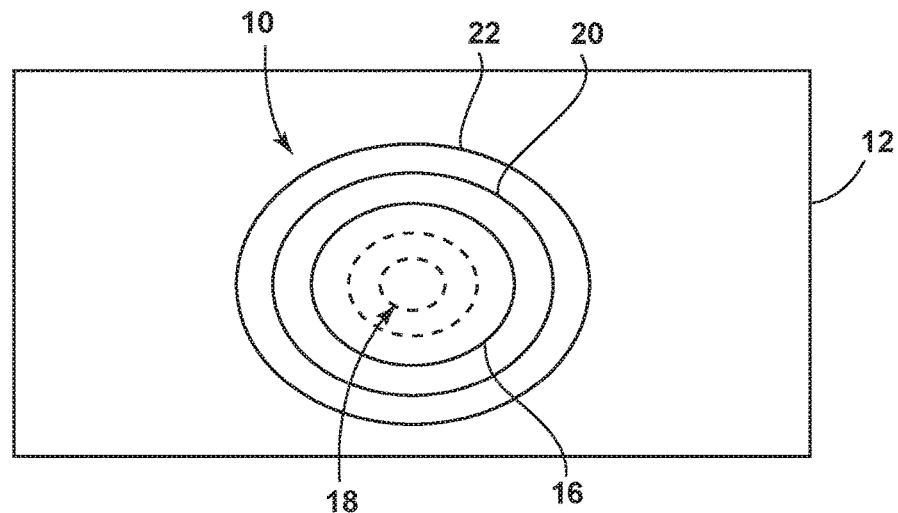
FIG. 1B is a top view of a luminescent structure rendered as a discrete particle according to various embodiments.
Figure 1C:
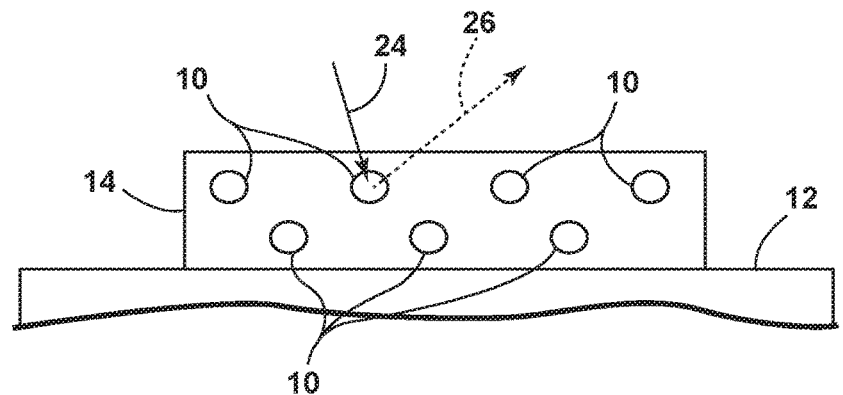
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source 52 (FIG. 4) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to various embodiments, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to various embodiments, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various embodiments, the rare earth aluminum garnet type Ce phosphor may serve as the luminescent material 18 with ultra-short-persistence characteristics, which can emit the converted light 26 by absorbing purple to blue excitation light 24 emitted from the light sources 52. According to various embodiments, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Agrawal et al., the entire disclosure of which is incorporated herein by reference.

Additionally, or alternatively, the luminescent material 18, according to various embodiments, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 52). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various embodiments, may be operable to emit light at or above an intensity of 0.32 mcd/m² after a period of 10 minutes. Additionally, the long-persistence luminescent material 18 may be operable to emit light above or at an intensity of 0.32 mcd/m² after a period of 30 minutes and, in various embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 52 that emit the excitation light 24, including, but not limited to, natural light sources (e.g., the sun) and/or any artificial light sources 52. The periodic absorption of the excitation light 24 from any excitation source may provide for a substantially sustained charge of the long-persistence luminescent material 18 to provide for consistent passive illumination. In various embodiments, a light sensor may monitor the illumination intensity of the luminescent structure 10 and actuate an excitation source when the illumination intensity falls below 0.32 mcd/m², or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various embodiments, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various embodiments, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Figure 3:
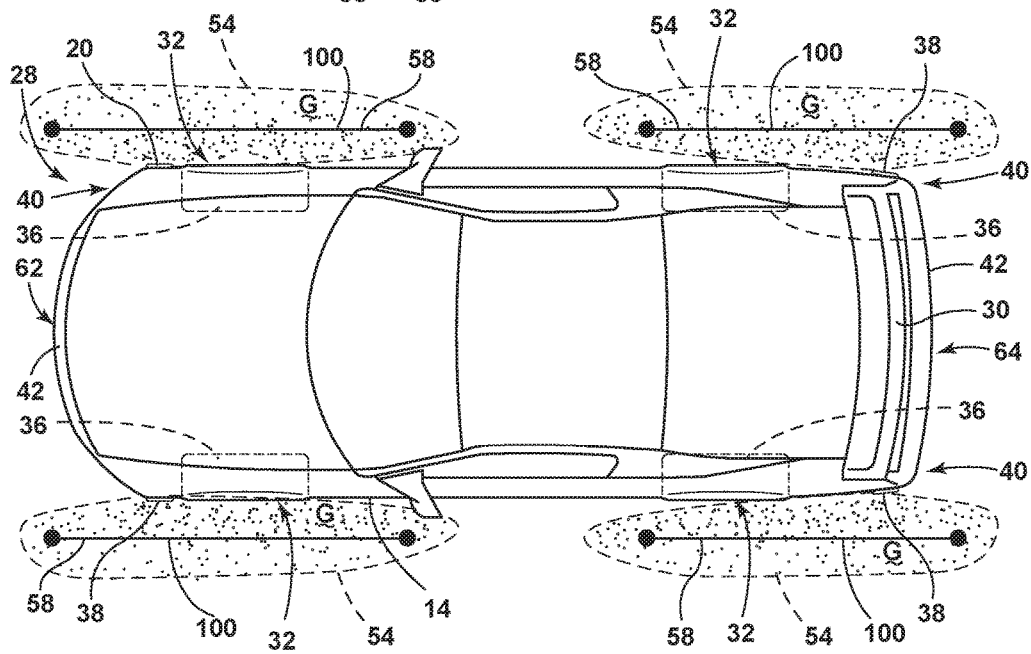
FIG. 3 is a top view of an automotive vehicle having the illumination assemblies shown in FIG. 2.

Referring to FIGS. 2 and 3, a vehicle 28 is shown in the form of a passenger car having a body 30 and four wheel assemblies 32 having central wheels 34 and tires 36 assembled thereto. The vehicle 28 may include any wheeled vehicle, such as a car, a truck, or a bus without departing from the scope of the disclosure. The vehicle 28 may be further equipped with an illumination assembly 38 to illuminate a corresponding area disposed proximate a corner 40 of the vehicle. According to various embodiments, each illumination assembly 38 may be disposed on a side portion of a vehicle bumper 42. Additionally, and/or alternatively, each illumination assembly 38 may be disposed within a door frame 44, a roof rack, a wheel well 46, a side mirror 48, a quarter panel 50, within a side marker, on or within the body 30, and/or any other practicable location. In the example shown in FIG. 3, four illumination assemblies 38 illuminate proximately to the four corners 40 of the vehicle 28, respectively.

Each illumination assembly 38 includes a first light source 52 (FIG. 4) that is arranged to generate a light illumination pattern downward and laterally outward so as to illuminate a ground surface proximately disposed to a corresponding quarter panel 50, or other portion of the body 30, of the vehicle. A second light source 56 (FIG. 4) may be disposed within the illumination assembly 38 that is configured to generate an image 58, such as a line, symbol, indicia, etc. proximate the vehicle, and possibly within the illumination pattern 54 generated by the first light source 52. The image 58 may assist a driver in maneuvering the vehicle 28 within object constraints, such as a curb 60. For example, the illumination assembly 38 may assist a driver of the vehicle 28 in parking the vehicle 28 by illuminating a ground surface proximate on a front portion 62 and/or a rear portion 64 of the vehicle 28. The generated image 58 may extend forwardly, rearwardly, and/or laterally outward of the vehicle 28.

Figure 6:
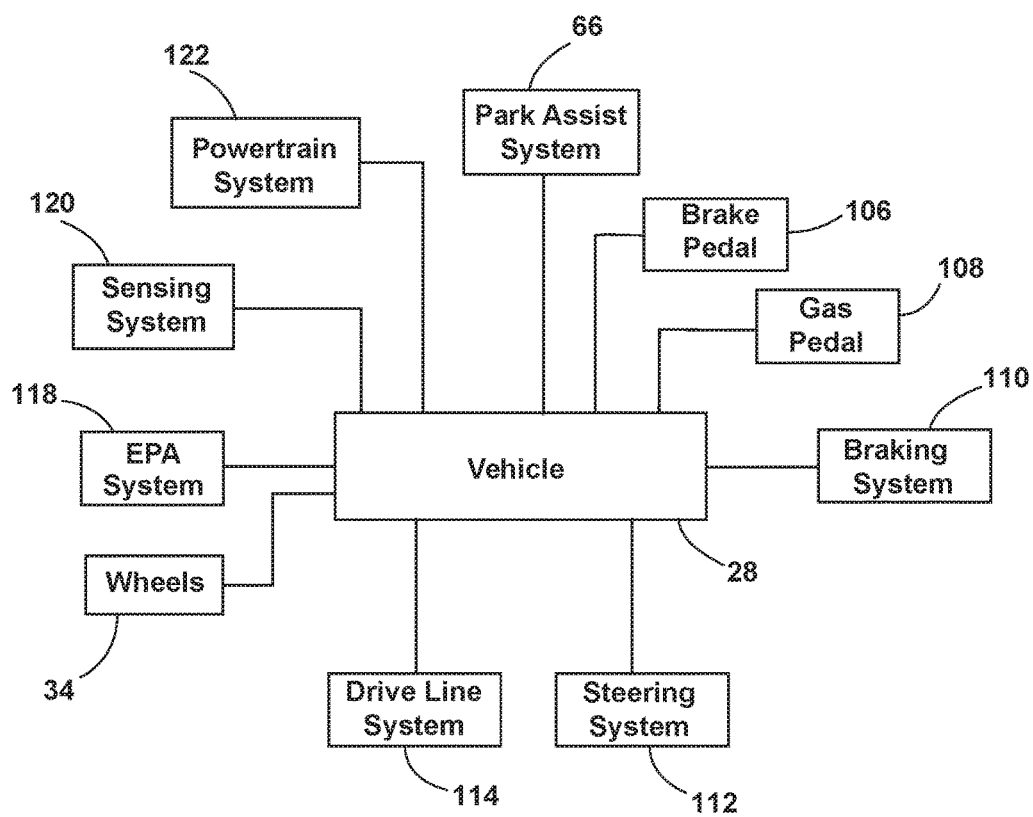
FIG. 6 is a schematic diagram of a vehicle equipped with a park assist system and other related components and equipment.
Figure 7:
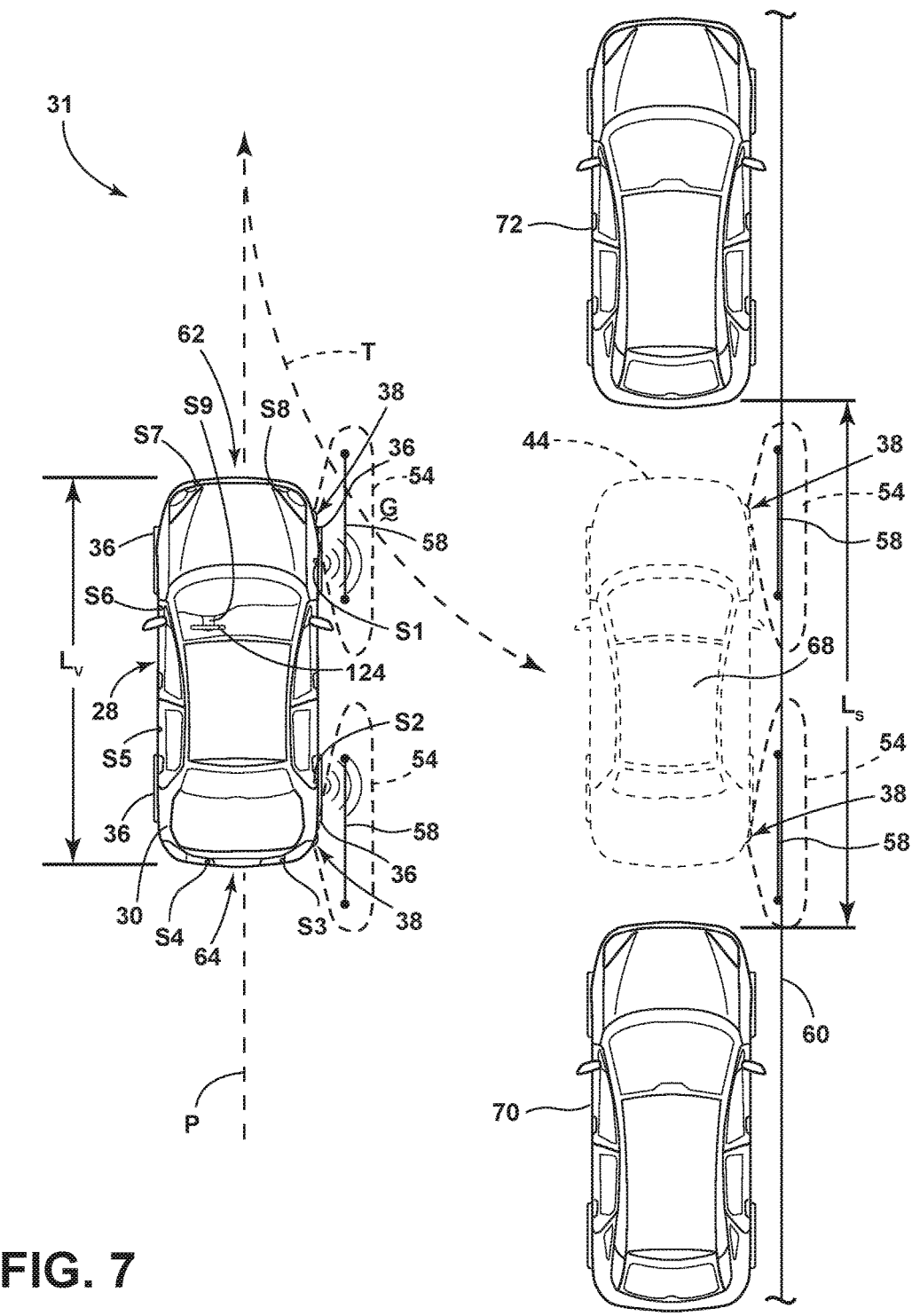
FIG. 7 illustrates a steering trajectory for backing a vehicle equipped with a park assist system into a target parking space.

According to various embodiments, the vehicle 28 may include a parking assist system 66 (FIG. 6). When the system is activated, one or more illumination assemblies 38 corresponding with the side of the vehicle 28 upon which a curb 60, or another object, may be located is activated. According to various embodiments, as the vehicle 28 approaches a parallel parking space 68 (FIG. 7), the illumination pattern 54 and/or generated image 58 may illuminate an area in front of the vehicle 28 and/or behind the vehicle 28 for the side of the vehicle 28 that is detected to be nearest to curb 60. The illumination pattern 54 may illuminate the curb 60 to assist in parking the vehicle 28 during low light conditions and the generated image 58 provides a guide to determine the vehicle 28 distance from the curb 60 and/or proximately disposed vehicles 70, 72 (FIG. 7). According to various embodiments, the generated image 58 may project a line 100 that is parallel to the vehicle 28 side to project a safe parking distance to the tires 36/wheels 34 on the side portion of the vehicle 28 proximate the object. The generated image 58 may additionally provide an indication of a safe distance in front and behind the vehicle 28. According to various embodiments, the illumination pattern 54 and the generated image 58 may be visible from the driver's viewpoint while seated in the driver's seat of the vehicle 28.

In addition to providing lighting for parking maneuvers, the illumination assembly 38 may further illuminate the tires 36, wheels 34, and/or nearby ground surface with light when a puddle lamp signal 140 (FIG. 11) is generated to provide puddle lamp lighting. For example, when an operator (person) approaching the vehicle 28 initiates a door unlock activation via an input on a key fob or other device, the four illumination assemblies 38 may all be activated to provide puddle lamp lighting. The puddle lamp lighting provided by the illumination assemblies 38 may be in addition to other lighting provided by puddle lamps otherwise provided on the vehicle 28, such as on the rearview exterior mirror 48, or may replace such puddle lamp assemblies. Further, the illumination assembly 38 may illuminate one or more tires 36, wheels 34, and/or the ground surface when the vehicle 28 is driven and a turn signal is generated to provide a turn signal indication. As such, the illumination assembly 38 may flash a red, amber, or other color light as a turn signal indication in addition to or in place of other vehicle turn signal indicators. Each of these additional functions may be provided through the illumination pattern 54, the generated image 58, and/or both.

Figure 4:
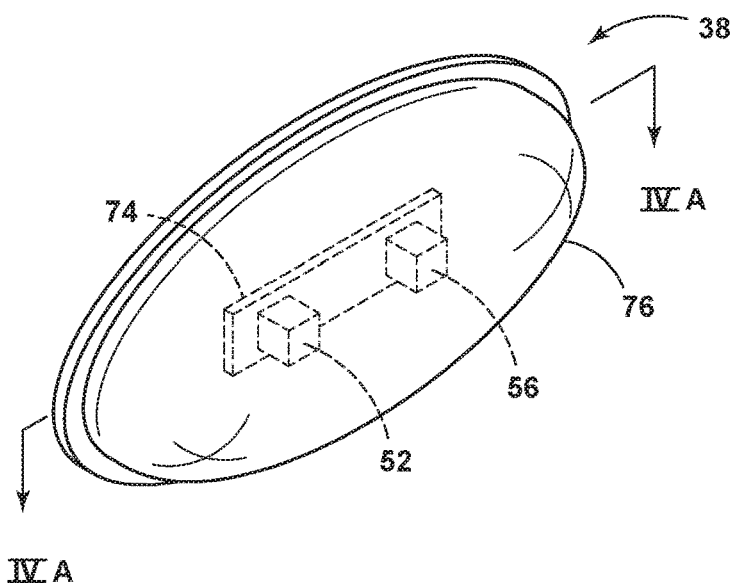
FIG. 4 is an enlarged perspective view of the illumination assembly employing two light sources, according to various embodiments.
Figure 4A:
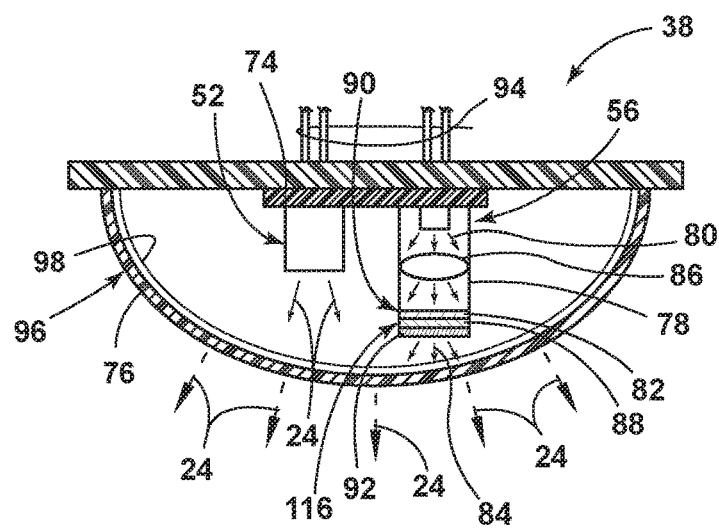
FIG. 4A is a cross-sectional view of the lamp assembly taken through line IVA-IVA of FIG. 4, according to various embodiments.
Figure 4B:
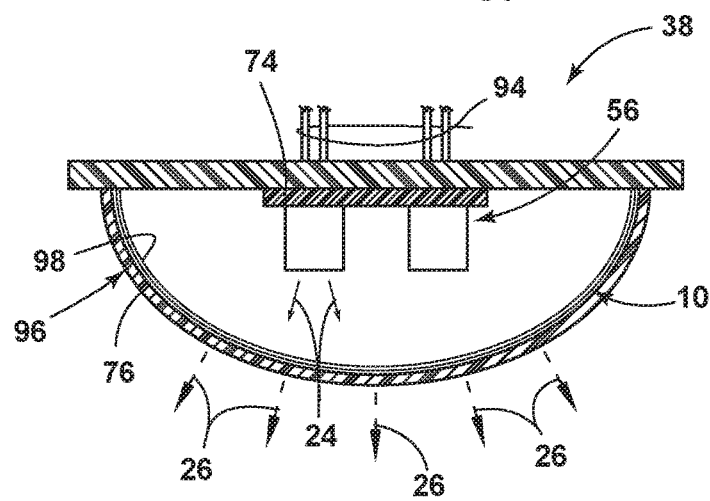
FIG. 4B is a cross-sectional view of the lamp assembly taken through line IVA-IVA of FIG. 4, according to alternate various embodiments.

The illumination assembly 38 is further illustrated in FIGS. 4-4B, according to various embodiments. The first and second light sources 52, 56 are shown mounted to a circuit board 74. The light sources 52, 56 may be configured to emit visible and/or non-visible light, such as blue light, ultraviolet (UV) light, infrared (IR) light, and/or violet light and may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the illumination assembly 38. Further, various types of LEDs are suitable for use as the light sources 52, 56 including, but not limited to, top-emitting LEDs, side-emitting LEDs, and others. Excitation light 24 generated by the one or more light sources 52, 56 passes generally through a lens 76 to the outside environment when one or more light sources 52, 56 is illuminated.

According to various embodiments, the second light source 56 may generate the image 58 through the utilization of a laser diode 78. As illustrated in FIG. 4A, the second light source 56 is chosen so that its emission spectrum 80 is compatible with the absorption band of a transition element doped solid-state laser rod 82. Accordingly, the light emission 80 from the second light source 56 will provoke a laser emission 84 in the rod 82. To focus the emission 80 of the second light source 56 onto the rod 82, transfer optics 86 may be used. One end 90 of the rod 82 may be coated to permit the light emission 80 to enter the rod 82, while at the same time discouraging a laser wavelength emission 84 from exiting an opposing rod end. A mirror 88 may be provided to create a resonant cavity 116 whose length is dictated by the distance between mirror 88 and the coating at the end 90 of the rod 82. The mirror 88 may be reflective at the laser emission 84 wavelength but at the same time is partially transmissive thereto, to allow the laser system to output the laser emission 84. An image filter 92 may be disposed on the mirror, or otherwise disposed between the second light source 56 and lens that is configured to generate the desired image 58. According to various embodiments, the second light source 56 may be any other type of light source, rather than a laser diode 78 that is operably coupled to the image filter 92 to create the generated image 58 when the second light source 56 is activated.

Referring still to FIGS. 4-4B, each of light sources 52, 56 includes electrical circuitry 94 for receiving electrical power to generate the illumination pattern 54 and/or generate image 58 at a desired wavelength or frequency. In one embodiment, each of the light sources 52, 56 generates a light output at a different wavelength. The lens 76 may include optics 96 to direct the light generated by the light sources 52, 56 downward into a desired illumination pattern 54, or light cone, to illuminate the ground surface extending laterally outward from the corresponding corner 40 of the vehicle 28. For example, the optics 96 may be configured as a Fresnel lens, a pillow optic, and/or any other type of lens or optic that is configured to disperse, concentrate, and/or otherwise direct excitation light 24 emitted from the illumination assembly 38 in any desired manner. It will be appreciated that the illumination patterns 54 and generated images 58 described herein may form light cones, which may be described as a surface in space-time, represented as a cone in three dimensions, including the points from which a light signal would reach a given point (at the apex) simultaneously, and that therefore appear simultaneous to an observer at the apex. Moreover, the light cone may be of any geometry without departing from the scope of the present disclosure.

In some embodiments, the illumination assembly 38 may include a decorative layer 98. The decorative layer 98 may include a material that is configured to control or modify an appearance of the lens 76 and/or any other portion of the illumination assembly 38. For example, the decorative layer 98 may be configured to confer a metallic appearance to portions of illumination assembly 38, such as the lens 76. Additionally, and/or alternatively, the decorative layer 98 may be utilized to assist in concealing the illumination assembly 38 disposed on the vehicle 28. The decorative layer 98 can be disposed on the lens 76, and/or any other portion of the illumination assembly 38, through any method known in the art, including, but not limited to, sputter deposition, vacuum deposition (vacuum evaporation coating), electroplating, or directly printing onto a component of the illumination assembly 38. The decorative layer 98 may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In various embodiments, the decorative layer 98 may be tinted any color to complement the vehicle 28 structure on which the illumination assembly 38 is to be received.

In various embodiments, the decorative layer 98 may have a textured or grained surface. The grained surface may be produced by laser etching the illumination assembly 38 and may provide for the illumination assembly 38 to have a varied or common appearance with proximately disposed components of the vehicle 28.

Referring to FIG. 4B, the luminescent structure 10 may be disposed on and/or within the lens 76, on the decorative layer 98, or otherwise disposed within the illumination assembly 38. In operation, the luminescent structure 10 may include a plurality of luminescent materials 18 therein that luminesce in response to receiving light of a specific wavelength. According to various embodiments, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

Figure 5:
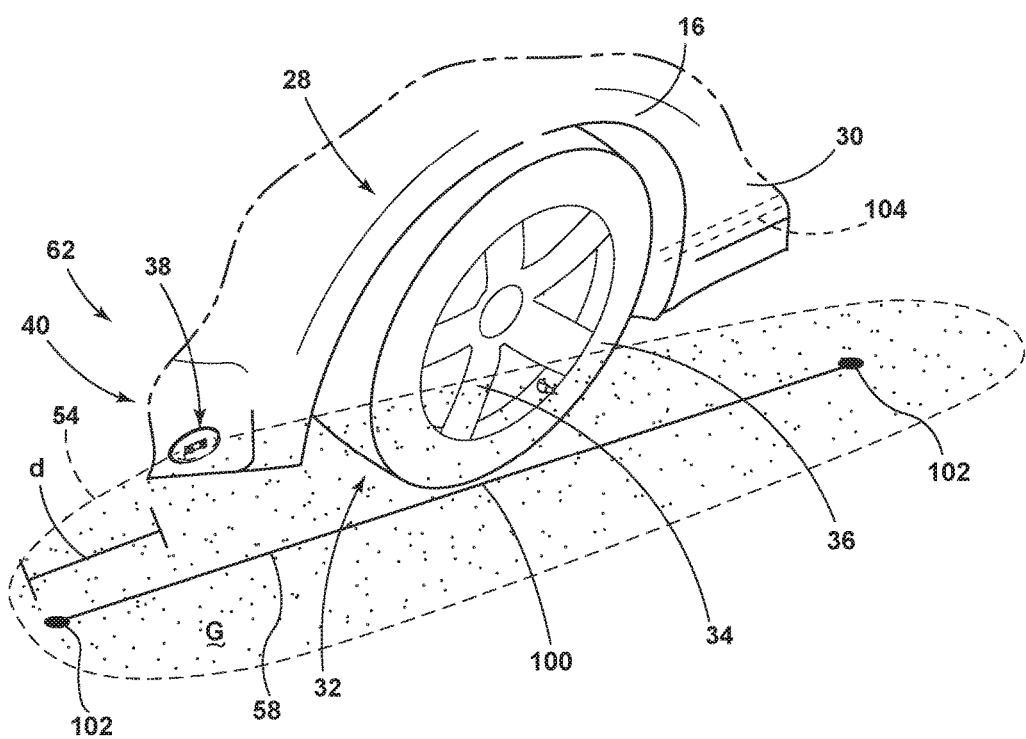
FIG. 5 is an enlarged perspective view of a portion of the vehicle body illustrating one of the wheel wells and illumination assembly for illuminating a ground surface proximate the vehicle.

Referring to FIG. 5, the illumination assembly 38 is shown generating a first illumination pattern 54 and a generated image 58 on the ground surface proximate the vehicle 28. In this example, a first wavelength of light is emitted from the first light source 52 to generate the illumination pattern 54. The first wavelength of light, according to various embodiments, could be in the white emission wavelength spectrum. The generated image may be a line 100 that includes endpoints 102 at each end of the line 100. The line 100 may extend a predefined distance forwardly of the vehicle 28 and/or rearwardly of the vehicle 28. Moreover, each end point may extend a common distance forwardly and/or rearwardly of the vehicle 28. The line 100 may also be a constant distance d laterally (e.g. parallel) from a portion of the vehicle 28, such as a frame 104 of the vehicle 28, to illustrate the distance between the vehicle 28 and a lateral object to the driver. As such, an operator of the vehicle 28 may be provided with illumination around the vehicle 28 as the vehicle 28 is operated between close objects. The illumination may also be presented when the vehicle 28 is not operating and an operator is approaching the vehicle 28, such as when the operator activates the door unlock input button on a key fob.

Referring to FIG. 6, a schematic diagram of the vehicle 28 is shown according to one embodiment. The vehicle 28 may include a brake pedal 106, a gas pedal 108, a braking system 110, a steering system 112, a drive line system 114, wheels 34, an electric power-assisted (EPA) steering system 118, which may be part of the steering system 112, a sensing system 120, a powertrain system 122, and a park assist system 66. Alternatively, an electro-assisted power steering system (not shown) may be used instead of the EPA steering system 118. Additionally, the vehicle 28 described herein may include other suitable equipment or systems in lieu of those described above.

Figure 8:
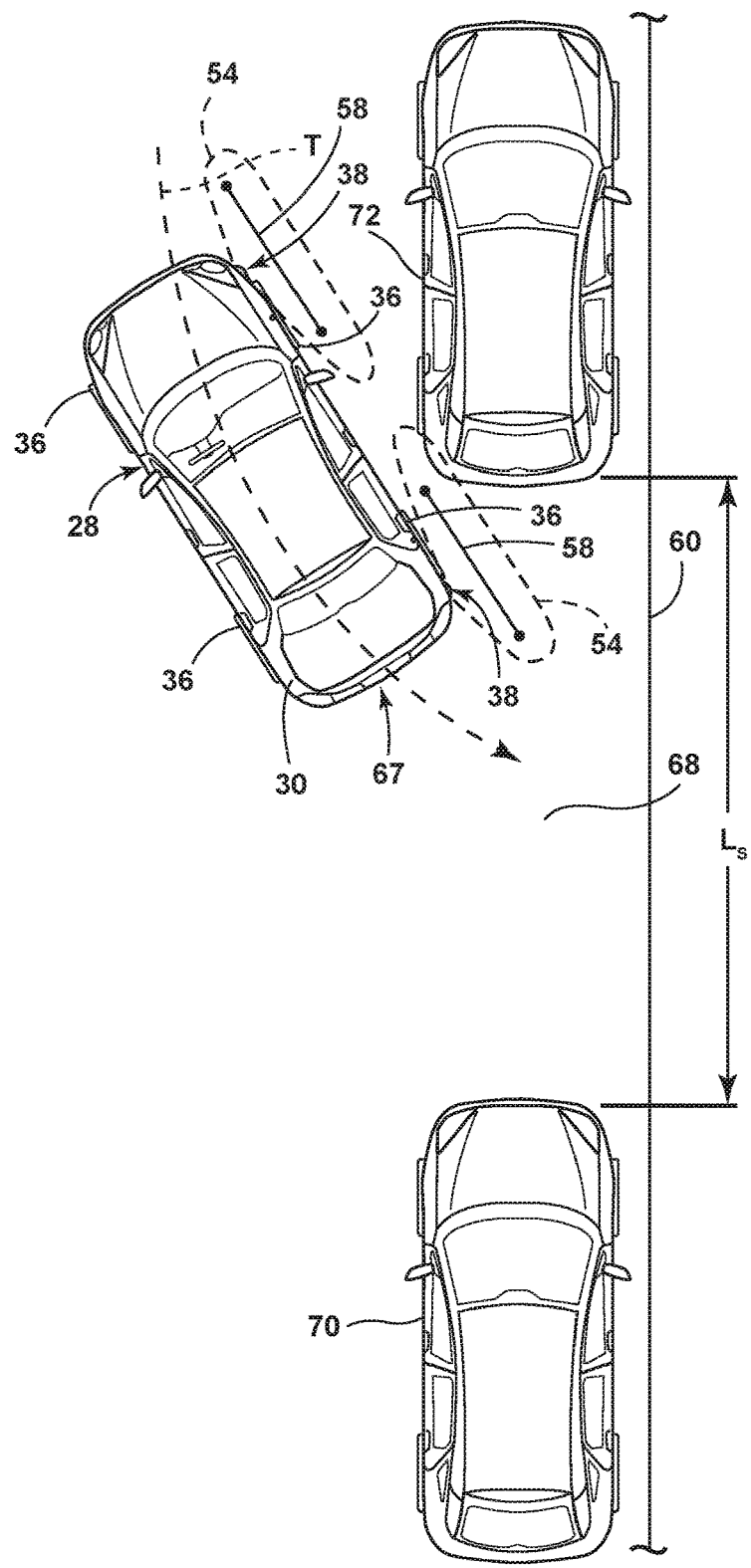
FIG. 8 illustrates a backing maneuver along a steering trajectory into a target parking space.
Figure 9:
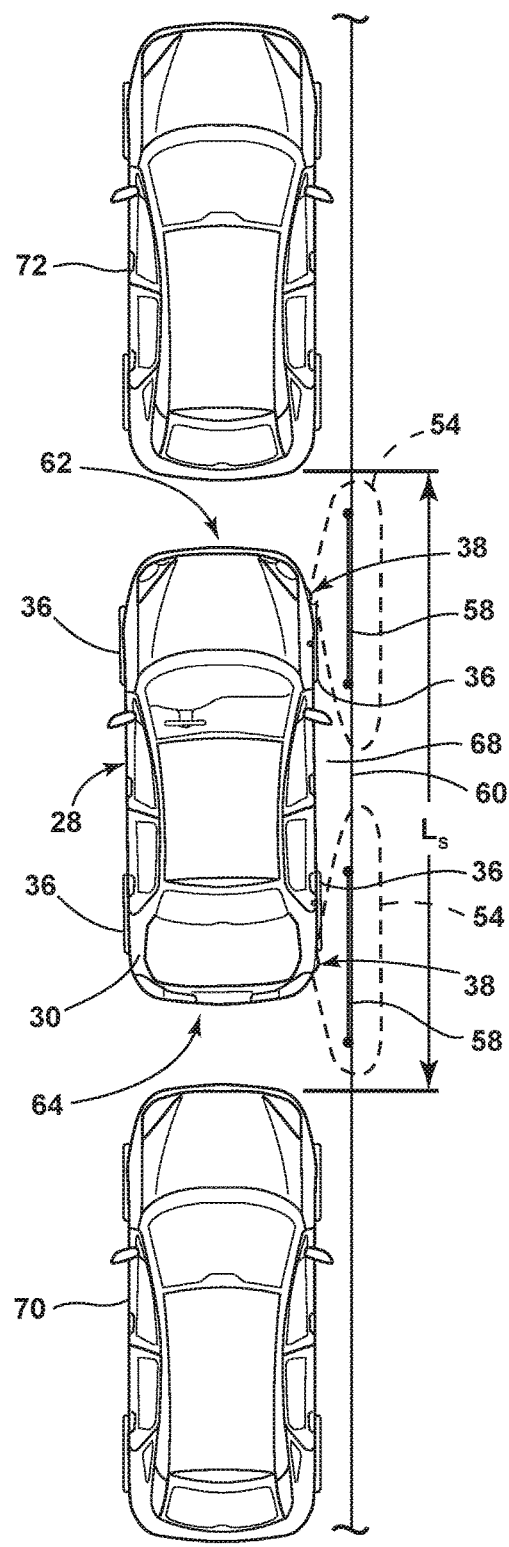
FIG. 9 illustrates a backing maneuver along a backward trajectory inside a target parking space.

Referring to FIGS. 7-9, the vehicle 28 is positioned in a target parking space 68 according to various embodiments. In the illustrated embodiment, the sensing system 120 includes ultrasonic sensors S1-S8 disposed variously on the front portion 62, side portions, and rear portion 64 of the vehicle 28. However, it should be appreciated that the number and/or location of the ultrasonic sensors S1-S8 may be other than illustrated, if so desired. The sensing system 120 also includes a steering wheel sensor S9, which may be located on a steering wheel 124 of the vehicle 28. Additionally, or alternatively, the sensing system 120 may include radar, LIDAR, cameras, lasers, thermal sensors, GPS sensors, odometric sensors, or a combination thereof.

In operation, the ultrasonic sensors S1-S8 are configured to detect neighboring objects and their location relative to the position of the vehicle 28 while the vehicle 28 is driven past the objects. In the illustrated embodiment, the vehicle 28 is driven along trajectory T and the objects correspond to a rear bounding object, shown as parked vehicle 70, a front bounding object, shown as parked vehicle 72, and a side bounding object, shown as the curb 60, all of which may be detected by ultrasonic sensors S1 and S2 while the vehicle 28 drives past them at a slow speed. The park assist system 66 processes information received from ultrasonic sensors S1 and S2 to determine a slot length $L_s$ of the target parking space 68 and then determines whether the slot length $L_s$ is sufficient based on the known length $L_v$ of the vehicle 28.

In practice, a slot length $L_s$ may be sufficient if it is large enough to allow the vehicle 28 to be parallel parked inside the target parking space 68 without coming into contact with objects detected by ultrasonic sensors S1-S8 of the vehicle 28. Upon determining that the slot length $L_s$ is sufficient, the sensing system 120 computes a steering trajectory T for parking the vehicle 28 into the target parking space 68 based on information received from one or more components of the sensing system 120 and the position of the vehicle 28 relative to neighboring objects. The driver of the vehicle 28 may then be notified that a parallel parking maneuver can be successfully performed into the target parking space 68 and is instructed to stop the vehicle 28 to commence the parallel parking maneuver. Notifications to the driver may include visual notifications such as text messages appearing on a display inside the vehicle 28, auditory notifications, haptic notifications, and/or other sensory notifications.

Depending on the slot length $L_s$ of the target parking space 68, the parallel parking maneuver may be variously performed as a series of maneuvers. Such maneuvers generally include backing the vehicle 28 along the steering trajectory T, stopping the vehicle 28 briefly inside the target parking space 68, and moving the vehicle 28 backward and/or forward inside the target parking space 68 before stopping the vehicle 28 in a final parking space 68. Each maneuver may be performed by the driver, semi-autonomously with the assistance of the driver, and/or autonomously in vehicles equipped with such functionality. Thus, it is to be understood that the methods and depictions described below are provided in regard to one possible vehicle configuration and should not be seen as limiting. As illustrated in FIG. 8, the generated image assists in ensuring that sufficient distance is maintained between the object and the vehicle 28 while the vehicle 28 is moved along the steering trajectory T. Once the vehicle 28 is disposed within the parking space 68, the generated images on the corresponding side of the vehicle 28 may align with the curb 60.

Figure 10:
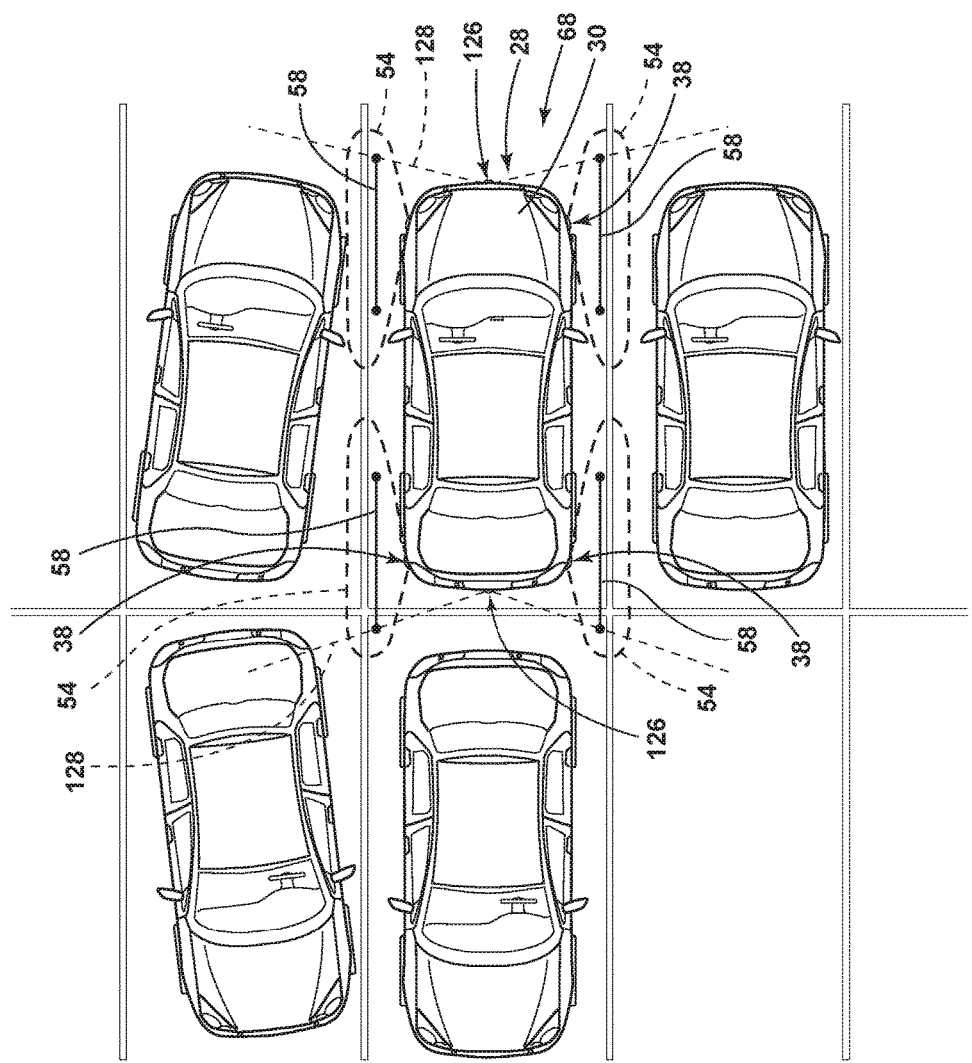
FIG. 10 illustrates the vehicle disposed between two adjacently disposed vehicles.

Referring to FIG. 10, if the ultrasonic sensors S1-S8 detect objects on both lateral sides of the vehicle 28, the illumination assemblies 38 on both sides of the vehicle 28 may illuminate. Accordingly, the vehicle driver may determine whether the amount of space 68 between the two objects is sufficient for disposing the vehicle 28 therebetween. The extension of the generated image rearwardly of the vehicle 28 may also provide additional information as to the distance between the vehicle 28 and a rearwardly disposed object.

Additionally, imaging sensors (e.g., cameras 126) may be disposed around the exterior of the vehicle 28 and provide an image of proximately disposed objects on a display within the vehicle 28. The camera 126 includes an image sensor having an area type image sensor such as a CCD or a CMOS image sensor and image-capturing optics (not shown), and captures an image of an imaging field of view 128 defined by the image-capturing optics. According to various embodiments, the generated images may within the fields of view of the one or more cameras 126 so that the driver may be able to view the generated images outside of the vehicle 28 and/or on the display.

Figure 11:
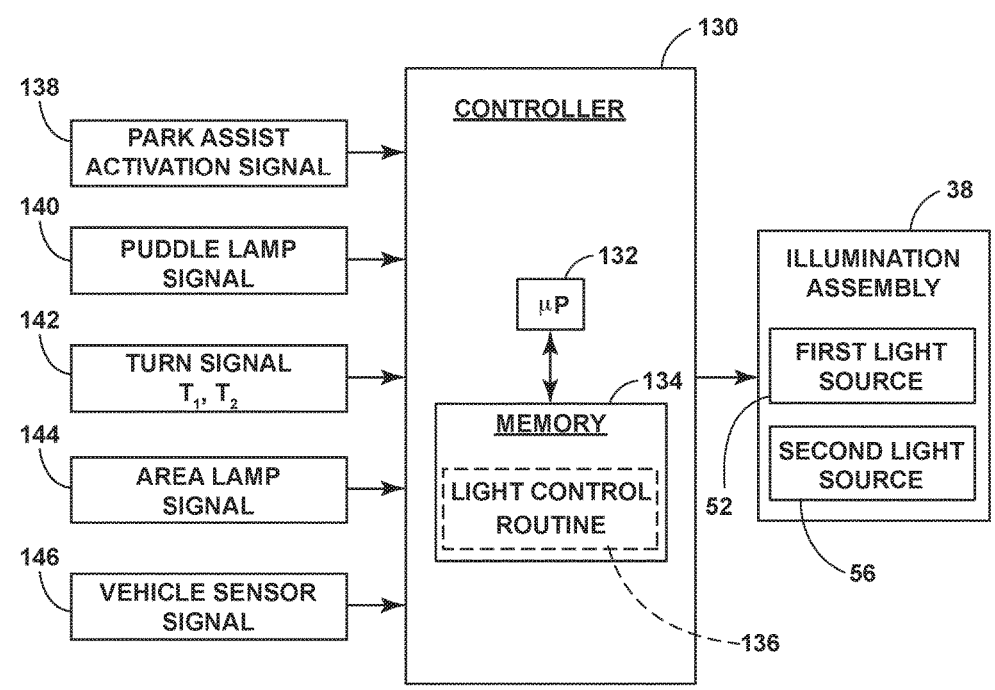
FIG. 11 is a block diagram of the illumination assembly, according to various embodiments.

The illumination assemblies 38 are shown in FIG. 11 controlled by a controller 130 in response to various inputs. The illumination assemblies 38 each include first and second light sources 52, 56 located near each corner 40 of the vehicle 28. The controller 130 is shown including control circuitry in the form of a microprocessor 132 and memory 134. A light control routine 136 is shown stored in memory 134 and executable by the microprocessor 132. The microprocessor 132 or other control circuitry processes the various inputs and the light control routine 136 and generate outputs to control the light sources 52, 56 within each of the illumination assemblies 38. It should be appreciated that other analog and/or digital circuitry may be employed to process the various inputs and routines to activate the illumination assemblies 38.

The inputs to controller 130 include a park assist activation signal 138. As discussed above, the vehicle 28 may include a park assist system 66 and the controller 130 may activate one or more illumination assemblies 38 in conjunction with the park assist system 66. In addition, puddle lamp signals 140 are input to the controller 130 indicative of a desired activation of puddle lamps. Further, two turn signals T1, T2 are input to the controller 130 indicative of the desired turn indication for when the driver indicates the vehicle 28 is to turn to the left or the right. As such, the two left-side illumination assemblies 38 flash light to indicate a left turn and the two right-side illumination assemblies 38 flash light to indicate a right turn. Further, one or more area lamp signals 144 may be input to the controller 130 indicative of the driver requesting activation of an area lamp lighting. Lastly, one or more exterior sensors of the vehicle 28 may detect an object and send a vehicle sensor signal 146 to the controller 130 causing illumination of the first and/or second light sources 52, 56 in response to detection of the object. The controller 130 processes the various inputs 138, 140, 142, 144, 146 pursuant to the light control routine 136 to activate the illumination assemblies 38 as described herein.

A variety of advantages may be derived from the use of the present disclosure. For example, use of the illumination assembly disclosed herein provides the driver of the vehicle with information relating to the distance between the vehicle and proximately disposed objects. Moreover, the illumination assembly disclosed herein aligns a vehicle with proximately disposed objects. The illumination assembly may be manufactured at low costs when compared to standard vehicle light assemblies.

According to various embodiments, an illumination assembly is provided herein. The illumination assembly includes a first light source configured to generate an illumination pattern. A second light source is configured to generate an image within the illumination pattern. A lens is optically coupled with the first and second light sources. A controller is configured to control the activation state of the first and second light sources. The illumination assembly may be configured as a vehicle illumination assembly. Embodiments of the illumination assembly can include any one or a combination of the following features:

the first and second light sources are disposed proximately to a corner of a vehicle;

the image is configured as a line that is substantially parallel to a frame of a vehicle;

the illumination pattern illuminates a ground surface proximate a front portion of the vehicle and the line extends forwardly of the vehicle;

the illumination pattern illuminates a ground surface proximate a rear portion of the vehicle and the line extends rearwardly of the vehicle;

a sensor configured to detect an object proximate a vehicle, wherein the illumination assembly illuminates when the object is detected;

a luminescent structure operably coupled with the first and second light sources and configured to luminesce in response to receiving excitation light from the first or second light source;

the luminescent structure includes at least one luminescent material configured to convert an excitation light into a visible light;

the first and second light sources are illuminated in conjunction with an activation of a park assist system;

an imaging sensor having a predefined field of view, wherein a portion of the image is disposed within the field of view; and/or the second light source generates the image with a laser diode.

Moreover, a lighting method is provided herein. The method includes generating an illumination pattern from a first light source proximate a vehicle; generating an image within the illumination pattern from a second light source; detecting an object proximate the vehicle; and configuring a controller to activate a state of the first and second light sources when the object is detected.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An illumination assembly, comprising:
   a first light source configured to generate an illumination pattern;
   a second light source positioned relative to the first light source to generate an illuminated image, wherein the illuminated image is disposed within the illumination pattern generated by the first light source;
   a lens optically coupled with the first and second light sources; and
   a controller configured to control an activation state of the first and second light sources.

2. The illumination assembly of claim 1, wherein the first and second light sources are disposed proximately to a corner of a vehicle.

3. The illumination assembly of claim 1, wherein the illuminated image is configured as a line that is substantially parallel to a frame of a vehicle.

4. The illumination assembly of claim 3, wherein the illumination pattern illuminates a ground surface proximate a front portion of the vehicle and the line extends forwardly of the vehicle.

5. The illumination assembly of claim 3, wherein the illumination pattern illuminates a ground surface proximate a rear portion of the vehicle and the line extends rearwardly of the vehicle.

6. The illumination assembly of claim 1, further comprising:
   a sensor configured to detect an object proximate a vehicle, wherein one of the first light source, the second light source and both the first and second light sources of the illumination assembly illuminate when the object is detected.

7. The illumination assembly of claim 1, further comprising:
   a luminescent structure operably coupled with the first and second light sources and configured to luminesce in response to receiving excitation light from the first or second light source.

8. The illumination assembly of claim 7, wherein the luminescent structure includes at least one luminescent material configured to convert an excitation light into a visible light.

9. The illumination assembly of claim 1, wherein the second light source includes a laser diode.

10. A vehicle, comprising:
a first illumination assembly configured to illuminate an area proximate a first lateral side of said vehicle;
a second illumination assembly configured to illuminate an area proximate a second lateral side of said vehicle, wherein the second lateral side of said vehicle is an opposed side of said vehicle relative to the first side, and further wherein the first and second illumination assemblies each include a first light source configured to generate an illumination pattern and a second light source configured to generate an illuminated image disposed within the illumination pattern of the first light source; and
a sensor configured to detect objects proximate the vehicle, wherein the first or second illumination assembly illuminates a lateral side of the vehicle corresponding to a detected object.

11. The vehicle of claim 10, further comprising:
a lens optically coupled with the first and second light sources.

12. The vehicle of claim 10, further comprising:
a luminescent structure operably coupled with the first and second light sources and configured to luminesce in response to receiving excitation light from the first or second light source.

13. The vehicle of claim 10, wherein the first light source emits a first wavelength of light and the second light source emits a second wavelength of light.

14. An illumination assembly, comprising:
a first light source configured to generate an illumination pattern;
a second light source spaced-apart from the first light source, wherein the second light source is operably coupled with an image filter to generate an image, and further wherein the image is positioned within the illumination pattern generated by the first light source; and
a controller configured to control an activation state of the first and second light sources.

15. The illumination assembly of claim 14, further comprising:
a sensor configured to detect objects proximate the vehicle, wherein the first and second light sources illuminate a ground surface on a lateral side of the vehicle corresponding to the detected object.

16. The illumination assembly of claim 14, wherein the image extends forwardly of a front portion of the vehicle.

17. The illumination assembly of claim 14, further comprising:
a luminescent structure operably coupled with the first and second light sources and configured to luminesce in response to receiving excitation light from the first or second light source.

* * * * *